United States Patent
Iyer et al.

(10) Patent No.: US 10,937,191 B2
(45) Date of Patent: Mar. 2, 2021

(54) PREDICTIVE SIMULTANEOUS LOCALIZATION AND MAPPING SYSTEM USING PRIOR USER SESSION POSITIONAL INFORMATION

(71) Applicant: Dell Products, LP, Round Rock, TX (US)

(72) Inventors: Vivek Viswanathan Iyer, Austin, TX (US); Yagiz C. Yildiz, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 226 days.

(21) Appl. No.: 16/168,165

(22) Filed: Oct. 23, 2018

(65) Prior Publication Data

US 2020/0126252 A1    Apr. 23, 2020

(51) Int. Cl.
*G06T 7/73* (2017.01)
*G06N 5/04* (2006.01)
(Continued)

(52) U.S. Cl.
CPC .................. *G06T 7/74* (2017.01); *G01C 3/14* (2013.01); *G01C 21/005* (2013.01); *G01C 21/165* (2013.01); *G02B 27/017* (2013.01); *G06F 1/163* (2013.01); *G06F 16/29* (2019.01); *G06N 5/046* (2013.01); *G06T 2207/30244* (2013.01)

(58) Field of Classification Search
CPC ...... G01C 21/005; G01C 21/165; G01C 3/14; G02B 27/017; G06F 16/29; G06F 1/163; G06N 5/046; G06T 2207/30244; G06T 7/74
See application file for complete search history.

(56) References Cited

U.S. PATENT DOCUMENTS 6,922,632 B2    7/2005    Foxlin
7,689,321 B2    3/2010    Karlsson
(Continued)

OTHER PUBLICATIONS

S. Riisgaard and M. Rufus Bals, "SLAM for Dummies, a Tutorial Approach to Simultaneous Localization and Mapping," May 2005, 127 pages.
(Continued)

*Primary Examiner* — Charles T Shedrick
(74) *Attorney, Agent, or Firm* — Prol Intellectual Property Law, PLLC; H. Kenneth Prol

(57) ABSTRACT

An information handling system operating a predictive simultaneous localization and mapping (SLAM) system may comprise a camera mounted to a wearable headset capturing an image of a landmark, a positional sensor mounted to the wearable headset measuring a current positional state of the headset, and a network adapter receiving a stored SLAM frame, including an identification and position of the landmark within a previously captured image. A processor executing code instructions of the predictive SLAM system may generate a current SLAM frame based on the image captured via the camera, determine a Kalman gain associated with an observed location of the landmark based on the current SLAM frame and the stored SLAM frame, and determine a corrected position of the wearable headset based on a previously measured positional state of the headset, the current positional state of the headset, the current SLAM frame, and the Kalman gain.

20 Claims, 7 Drawing Sheets

(51) Int. Cl.
*G02B 27/01* (2006.01)
*G01C 21/00* (2006.01)
*G01C 21/16* (2006.01)
*G01C 3/14* (2006.01)
*G06F 1/16* (2006.01)
*G06F 16/29* (2019.01)

(56) References Cited

U.S. PATENT DOCUMENTS

| | | | |
|---|---|---|---|
| 7,774,158 | B2 | 8/2010 | Domingues Goncalves |
| 8,649,565 | B1 | 2/2014 | Kim |
| 10,586,302 | B1* | 3/2020 | Brooks ............... G06F 3/011 |
| 2005/0182518 | A1 | 8/2005 | Karlsson |
| 2005/0238200 | A1 | 10/2005 | Gupta |
| 2010/0094460 | A1 | 4/2010 | Choi |
| 2014/0350839 | A1 | 11/2014 | Pack |
| 2015/0304634 | A1 | 10/2015 | Karvounis |
| 2016/0259404 | A1* | 9/2016 | Woods ................ G01S 19/42 |
| 2016/0282618 | A1* | 9/2016 | Kon ..................... G06F 3/011 |
| 2017/0228932 | A1* | 8/2017 | Olson ................. G05D 1/0016 |
| 2018/0088185 | A1* | 3/2018 | Woods ................ G01R 35/00 |
| 2018/0227470 | A1* | 8/2018 | Ronngren .......... G02B 27/0093 |
| 2018/0249151 | A1* | 8/2018 | Freeman ............. A61B 5/1123 |
| 2018/0300897 | A1* | 10/2018 | Woods ................ G06F 3/0484 |
| 2019/0178654 | A1* | 6/2019 | Hare ................... G06T 7/70 |
| 2019/0197768 | A1* | 6/2019 | Taylor ................. G06T 17/00 |
| 2019/0222774 | A1* | 7/2019 | Kobayashi .......... G02B 27/017 |
| 2019/0387168 | A1* | 12/2019 | Smith ................. G06F 3/0304 |
| 2020/0098179 | A1* | 3/2020 | Gough ................. G06F 3/013 |
| 2020/0104969 | A1* | 4/2020 | Aratani ............... G06T 11/00 |
| 2020/0111262 | A1* | 4/2020 | Rabinovich ......... G06F 3/167 |
| 2020/0124845 | A1* | 4/2020 | Smith ................. G06F 3/14 |
| 2020/0158517 | A1* | 5/2020 | Tadi ................... G01C 21/32 |
| 2020/0162140 | A1* | 5/2020 | Tusi ................... H04B 7/0695 |

OTHER PUBLICATIONS

S. Frintrop, P. Jensfelt and H. Christensen, "Detecting Useful Landmarks for Visual SLAM," Workshop Robotic 3D Environment Cognition, at the International Conference Spatial Cognition, Bremen (Germany), Sep. 2006, 5 Pages.

M. Zeeshan Zia, L. Nardi, A. Jack, E. Vespa, B. Bodin, P.H.J. Kelly and A.J. Davison, "Comparative Design Space Exploration of Dense and Semi-Dense SLAM", Mar. 2016, 9 pages.

J. Tang, S. Liu and J.L. Gaudiot, "Embedded Systems Architecture for SLAM Applications," Feb. 2017, 4 pages.

Google Developers, "ARCore Overview," Sep. 2018, 3 pages.

Apple Developers, "ARKit," Sep. 2018, 6 pages.

Google Developers, "Fundamental Concepts," Sep. 2018, 5 pages.

E.B. Olson, "Real-Time Correlative Scan Matching," 2009, 7 pages.

H. Rao and W.T. Fu, "Combining Schematic and Augmented Reality Representations in a Remote Spatial Assistance System," Oct. 2013, 6 pages.

J. Sola, "Simultaneous localization and mapping with the extended Kalman filter," Oct. 2014, 35 pages.

* cited by examiner

PREDICTIVE SIMULTANEOUS LOCALIZATION AND MAPPING SYSTEM USING PRIOR USER SESSION POSITIONAL INFORMATION

FIELD OF THE DISCLOSURE

The present disclosure generally relates to head mounted displays for information handling systems. The present disclosure more specifically relates to determining positional state information for a head mounted display information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a head mounted user interface and/or display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
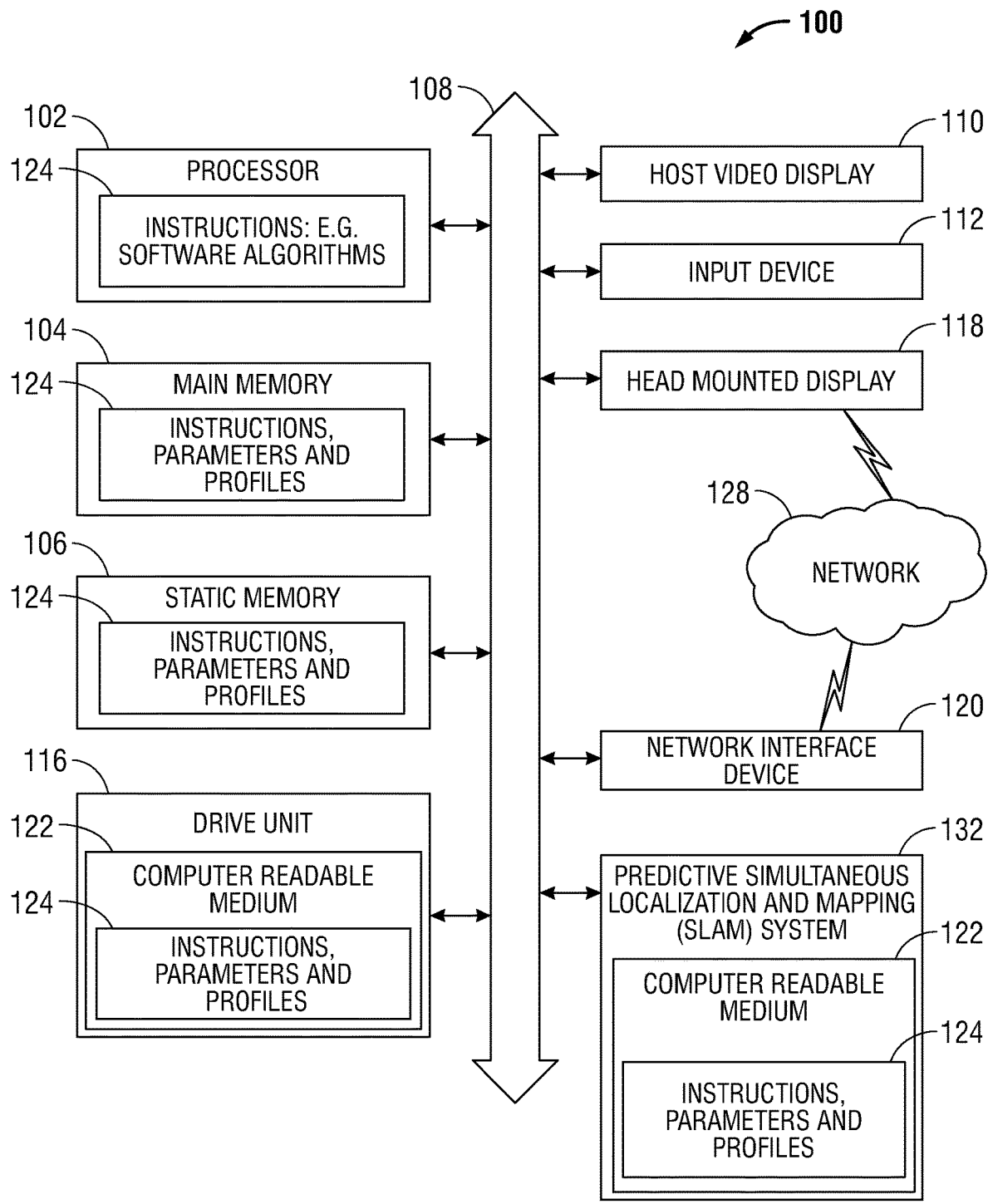
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display devices, wearable around the user's head and/or eyes and having the capability of reflecting projected images and/or allowing the user to see through it may be used with augmented or virtual reality display systems. Head mounted display devices capable of generating augmented reality (AR) and/or virtual reality (VR) user interfaces are finding widespread use in workplaces. Modalities and applications such as AR/VR assisted construction, design and engineering, and first responder efforts are gaining in popularity along with AR/VR in the gaming industry. An example use of an AR/VR assisted design and engineering project may include the use of a head mounted display device to visualize proposed designs for wheelchair accessible ingresses/egresses for various doors on a pre-built factory floor or established commercial building. Such an application of AR/VR assisted design and engineering may require the wearer of the headset to move freely about the commercial building in order to view each of the doors under consideration. The head mounted display in such a scenario may detect the placement of the headset within the commercial building, and project an image of a wheelchair accessible ingress/egress as it is designed to work with a given door as that door comes into view of the wearer.

Previous incarnations of head mounted display devices capable of generating such AR/VR user interfaces required the head mounted display device to be tethered to a laptop or desktop computer, which significantly reduces mobility of the headset. Headsets in such previous solutions were tethered to the laptop or desktop computer due to the amount of memory required to store three-dimensional representations of a given surrounding environment, as well as high processing requirements associated with identifying the position of the headset with respect to its surrounding environment, modeling the surrounding environment as viewed from the perspective of the headset wearer, and rendering the modeled image in a three-dimensional environment matching the surrounding real-world environment. Such a process is referred to as simultaneous localization and mapping (SLAM), and were carried out by multiple components within the headset and/or the tethered laptop or desktop computing device.

A SLAM process may involve real-time processing of the current location of a headset within a surrounding environment and simultaneous predictive processing of a future position of the headset. The real-time SLAM processing may begin by determining the location of the headset within its surrounding environment and projecting an image within the headset (either of the full surrounding environment as in VR, or of an object viewed as being incorporated within the surrounding environment as in AR) from the perspective of the headset. In order to accurately project what the surrounding environment looks like in real life from the perspective of the headset (which may be opaque such that surrounding environment cannot be viewed), or to project an object such that it accurately incorporates into the viewable surrounding environment, the position of the headset within the surrounding environment may be accurately determined. A real-time SLAM process may gauge the location of the headset within its environment by either determining the location of the headset with respect to a previous known location of the headset or with respect to one or more landmarks within the surrounding environment. The current location of the headset with respect to a previous location of the headset may be determined by comparing readings taken from a global positioning system (GPS) unit, an inertial measurement unit (IMU), and/or an eCompass unit within the headset to previous readings taken by the same units. Such a comparison may yield a known change in location, as well as a known velocity of the headset.

Embodiments of the present disclosure may use an inside-out localization process to determine the position of a head mounted display from one or more landmarks identified within a two or three-dimensional image of such landmarks. Each instance in time at which such an image is captured may be associated with an instantaneous perspective of the surrounding environment from the headset, accompanied by identification of those landmarks and their distances from the headset, referred to as a SLAM frame. Determination of the location of the landmark(s) within an image may be associated with some degree of uncertainty. Comparing multiple SLAM frames that include the same landmark may decrease the uncertainty associated with the identification of that landmarks position. In other words, the uncertainty associated with the identification of a given position of a landmark or landmark(s) may decrease while the system "learns" about its surrounding environment by moving around in it from frame to frame. In previous systems, the surrounding environment must be "learned" in each separate user session, as very little data from the previous user session may be stored between sessions. In other words, the landmarks in each environment would have been identified from scratch during each separate user session. Previous systems required an external information handling system to be physically tethered to the head mounted display because this "learning" session required a large amount of computing resources. A real-time localization process that more efficiently and accurately identifies landmarks without physically tethering the head mounted display to an external information handling system is needed.

The predictive simultaneous localization and mapping (SLAM) system in embodiments of the present disclosure addresses these issues by determining the position of the head mounted display, at least in part based on images of surrounding landmarks captured prior to a given user session. For example, two or three-dimensional images of landmarks within the head mounted display's environment may have been previously captured and stored within a SLAM lookup repository accessible by the head mounted display or a remotely located, wirelessly connected information handling system (e.g. laptop or desktop computer). Such images may be captured by the same or other head mounted displays, other two or three-dimensional cameras, or robotic rovers, and/or may be retrieved from crowd-sourced locations or cloud storage locations. Identification of one or more landmarks in such images may be made prior to or during a current user session either by the predictive SLAM system or by other systems in embodiments. Further, the locations of such identified landmarks in embodiments may be made during a current user session by the predictive SLAM system, or may have been made prior to the user session. In some embodiments, the SLAM repository may store fully-mapped SLAM frames that combine an image of a landmark, its identification, and its positional information with respect to the camera that captured the image (e.g. bearing and range).

The predictive SLAM system in embodiments of the present disclosure may retrieve SLAM frames from the SLAM repository, or generate SLAM frames from images retrieved from the SLAM repository in order to compare against SLAM frames generated in real-time during a current user session. By comparing multiple SLAM frames of the same landmark to one another, the predictive SLAM system in embodiments of the present disclosure may increase the accuracy of the determined position of the headset with respect to such landmarks. In such a way, the predictive SLAM system increases the accuracy of localization methods in real-time without the need for a "learning" period.

Further, the predictive SLAM system in an embodiment may access SLAM frames stored in a predictive SLAM cache in order to avoid brute force localization methods. In previous systems, the head mounted display may have been physically tethered to an external laptop or desktop, limiting mobility of the headset, due to processor-intensive brute force localization methods used to determine the position of the headset. A head mounted display having a measured position, velocity, and acceleration at a given moment in time may be capable of following several different possible trajectories in the future. In order to determine which of these trajectories the head mounted display actually takes, a brute force localization method compares the position of the head mounted display as reflected in a SLAM frame generated in real-time to each and every projected trajectory, in turn, to determine which one best fits the measured position of the head mounted display.

Embodiments of the present disclosure avoid this method by comparing the real-time SLAM frame to only a subset of possible trajectories. For example, the predictive SLAM system in embodiments of the present disclosure may only compare the generated real-time SLAM frame against trajectories previous users have been known to take during previous sessions. In such a way, the predictive SLAM system in an embodiment may decrease the processing power required to complete the localization process, thus negating the need to physically tether the head mounted display to an external information handling system, and increasing mobility of the head mounted display.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, computer readable medium 122 storing instructions 124 of the predictive SLAM system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a head mounted display 110, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display may use any method that reflects projected images in order to create an augmented reality. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may also include a predictive simultaneous mapping and localization (SLAM) system 132 that may be operably connected to the bus 108. The predictive SLAM system 132 computer readable medium 122 may also contain space for data storage. The predictive SLAM system 132 may perform tasks related to determining the position of a head mounted display in real-time with respect to one or more identified landmarks within a two or three-dimensional image captured by the head mounted display. In some embodiments, such a determination may be made based at least in part on images previously captured and stored within a SLAM repository located within memory 104, 106 or within computer readable medium 122. In an embodiment, the predictive SLAM system 132 may communicate with the main memory 104, the processor 102, the alpha-numeric input device 112, video display 110, head mounted display 118, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. In some embodiments, the head mounted display 118 may be accessed via the network 128 rather than via bus 108. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may execute a predictive SLAM system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the predictive SLAM system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the predictive SLAM system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the predictive SLAM system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The predictive SLAM system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
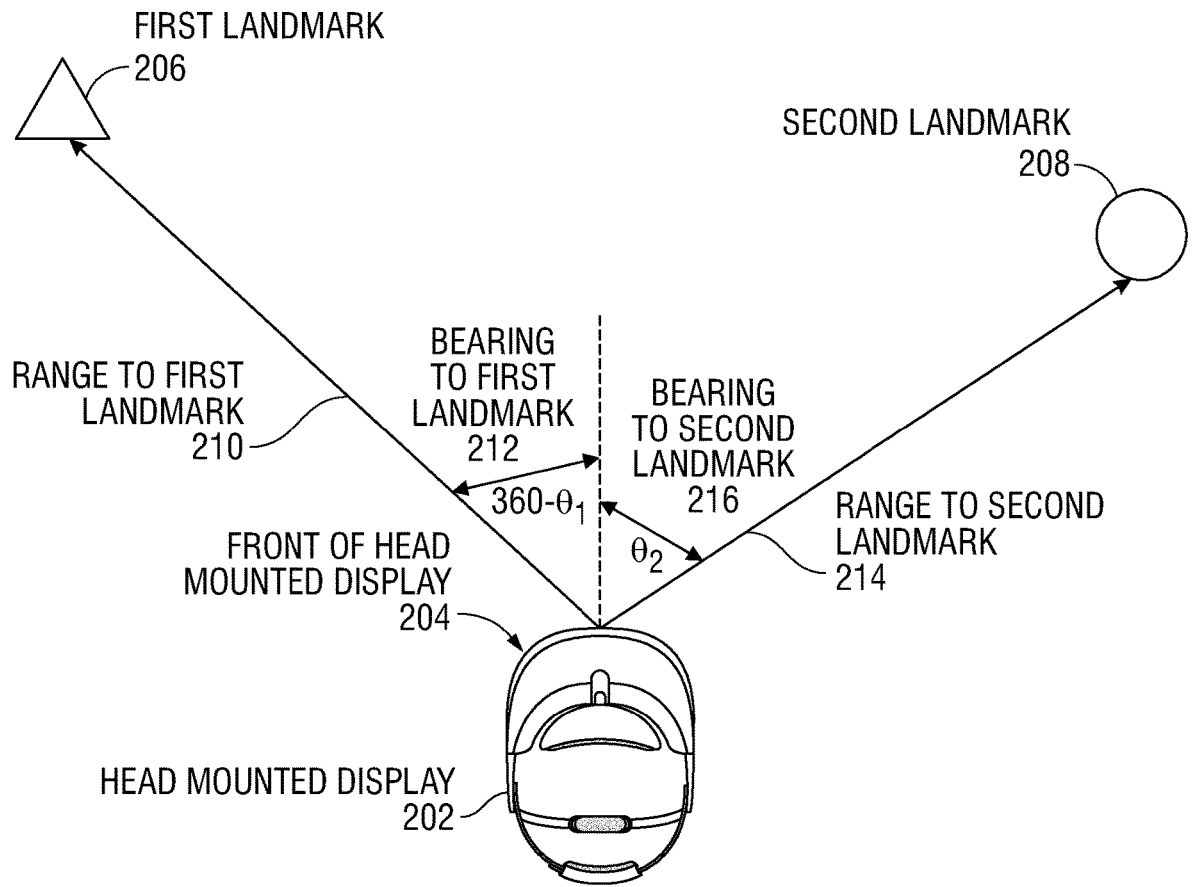
FIG. 2A is a graphical diagram illustrating coordinates of landmarks as measured based on a first video frame according to an embodiment of the present disclosure.

FIG. 2A is a graphical diagram illustrating coordinates of landmarks with respect to a head mounted display as measured based on a first video frame according to an embodiment of the present disclosure. A head mounted display 202 in an embodiment may include a camera capable of capturing video. The video captured in such an embodiment may consist of several frames captured over a period of time, where each frame is a still image. In other embodiments, the camera may capture still images only, not for use within a video, which may also each represent a single frame. The camera may be mounted within the front of the head mounted display 204. FIG. 2A depicts a top view of the head mounted display 202, such that the camera mounted thereon points outward from the front of the head mounted display 204, along the trajectory of the dotted line. In other words, the dotted line depicted in FIG. 2A illustrates a central axis within the field of view of a camera mounted within the head mounted display 202. In an example embodiment, a first landmark 206 and a second landmark 208 may be within the field of view of the head mounted display 202.

One or more frames capturing the surrounding environment within the field of view of the head mounted display 202 may be used to determine a location of one or more landmarks within the field of view. For example, in an embodiment in which the head mounted display 202 employs a depth sensor (e.g. three-dimensional camera), the range 210 between the head mounted display 202 and the first landmark 206 may be determined through analysis of a single three-dimensional captured image. In such an embodiment, a bearing 212 toward the first landmark 206 from the perspective of the head mounted display 202 may also be determined via analysis of the three-dimensional image. Bearing 212 in an embodiment may be measured in a clockwise direction away from the central axis of the head mounted display field of view. Thus, the bearing 212 may be equivalent to 360 degrees minus the bearing $\theta_1$ identified in FIG. 2A.

As another example, in an embodiment in which the head mounted display 202 employs a two-dimensional camera without a depth sensor, the range 214 between the second landmark 208 and the head mounted display 202 may be determined based on analysis of a plurality of two-dimensional images, along with data describing the movement of the head mounted display 202 (e.g. velocity, acceleration) between that plurality of two-dimensional images. In such an embodiment, a bearing 214 toward the second landmark 208 from the perspective of the head mounted display 202 may also be determined via analysis of the three-dimensional image. Bearing 212 in an embodiment may be measured in a clockwise direction away from the central axis of the head mounted display field of view. Thus, the bearing 214 may be represented by the bearing $\theta_2$ identified in FIG. 2A.

Coordinate information in an embodiment may take the form of a range (distance to) and bearing (direction of) a landmark with respect to the head mounted display, as with a two-dimensional polar (r, $\theta$) coordinate system. Coordinate information in the form of other coordinate systems are also contemplated in other embodiments, including two-dimensional (x, y), three-dimensional (x, y, z), spherical (r, $\theta$, $\varphi$), and geographic (latitude, longitude, elevation). These are only a few examples of coordinate systems that may be used, and any coordinate system capable of describing the orientation of one object to another is also contemplated herein.

Positional information (e.g. range, bearing) for the first and second landmarks 206 and 208 respectively depicted in FIG. 2A may be used to map the position at a first instance in time of the head mounted display 202, first landmark 206, and second landmark 208 in a two or three-dimensional virtual environment. Such a positional map describing the positions of the head mounted display 202, first landmark 206, and second landmark 208 may be referred to herein as a SLAM frame. The process of identifying the actual locations of the head mounted display 202, first landmark 206, and second landmark 208 based on one or more captured images may be referred to herein as real-time SLAM processing, as the process occurs as the image is captured. Another aspect of a SLAM process involves predicting the future locations of the head mounted display 202, first landmark 206, and second landmark 208 based on projected trajectories of the head mounted display 202 and current positions of the landmarks 206 and 208 may be referred to herein as predictive SLAM processing.

Figure 2B:
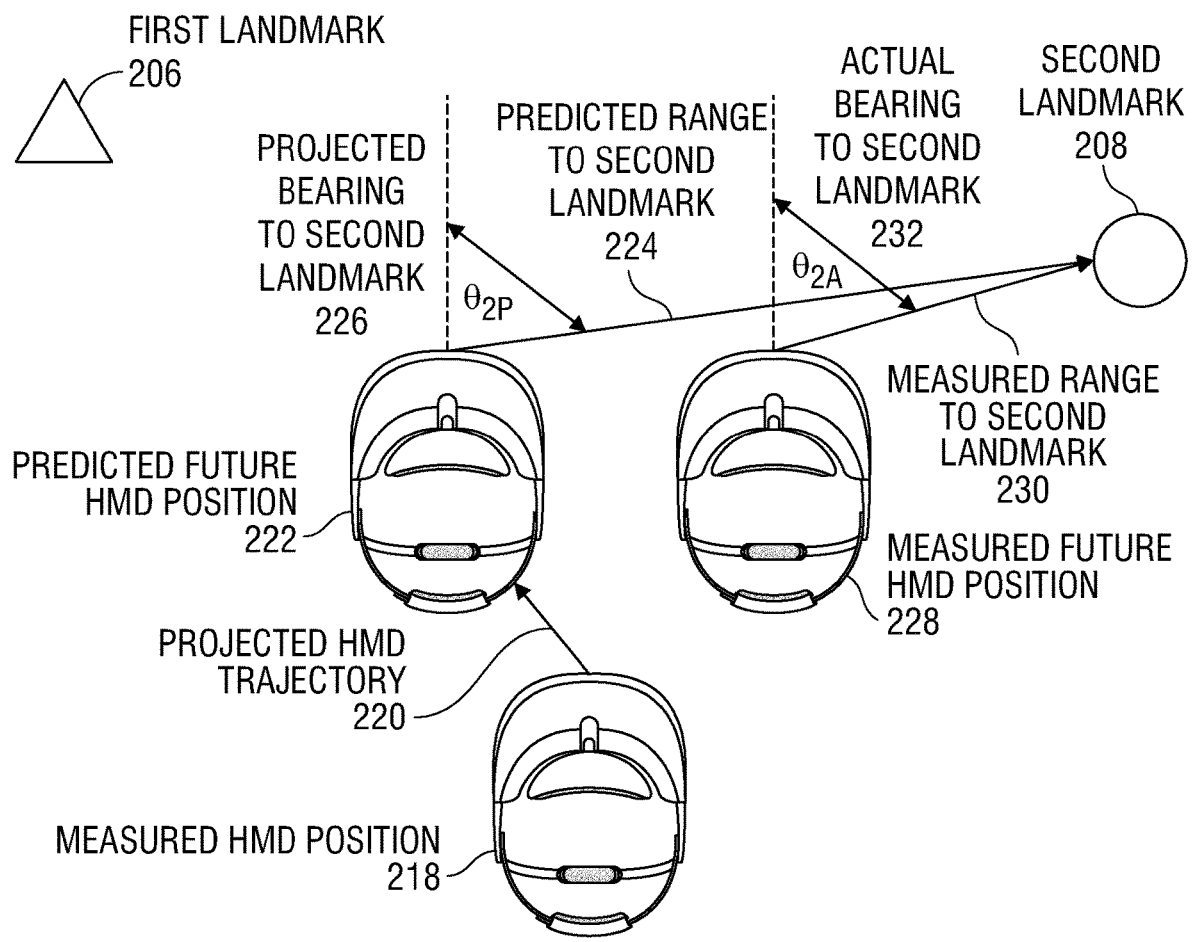
FIG. 2B is a graphical diagram illustrating future coordinates of landmarks according to an embodiment of the present disclosure.

FIG. 2B is a graphical diagram illustrating future coordinates of landmarks with respect to a head mounted display according to an embodiment of the present disclosure. The head mounted display (HMD) may be located at a first position 218 as measured based on the first video frame discussed above with reference to FIG. 2A, as well as positional information measured at the head mounted display (e.g. by GPS unit, IMU, accelerometer, eCompass unit). At an instance in time after the first video frame is captured, the position of the head mounted display may change in an embodiment. In anticipation of this change in position, the predictive SLAM system in an embodiment may estimate a predicted position 222 of the head mounted display at a later instance in time. Such a predicted position 222 may be estimated based on a projected trajectory 220 of the head mounted display, as well as the measured position 218 of the HMD in some embodiments. The head mounted display in an embodiment may include sensors (e.g. GPS unit, IMU, eCompass unit, accelerometer) capable of determining its positional state, including velocity and/or acceleration. In other embodiments, the predicted position 222 may be determined via comparison of two or more images captured by an onboard camera at and/or prior to the time at which the first video frame is captured.

The predicted HMD position 222 may be represented by a predicted range and bearing from one or more of the known landmarks 206 and 208. For example, the predicted HMD position 222 in an embodiment may be located a predicted range 224 from the second landmark 208, having a projected bearing 226 of $\theta_{2P}$ from the central axis of the head mounted display field of view. The predicted position 222 may be reached by the head mounted display located at position 218 following the predicted trajectory 220. The predicted trajectory 220 and/or predicted position 222 in an embodiment may be determined based at least partially on previous paths taken by users in previous user sessions, or by paths previously taken by the current user in the current user session.

The head mounted display in an embodiment may or may not follow the predicted trajectory 220 to reach the position 222. For example, in one embodiment, rather than following the predicted trajectory 220, the head mounted display may reach the position 228 at the time it was predicted to reach the position 222. In such an embodiment, the head mounted display may be located a range 230 and bearing 232 from the second landmark 208, rather than predicted range 224 and predicted bearing 226. Comparison of an image of the second landmark previously captured from the position 222 to an image of the second landmark 208 as captured by the head mounted display during a current user session from position 228 may assist in more accurately determining the true location of the head mounted display with respect to the second landmark 208 in an embodiment.

Figure 3:
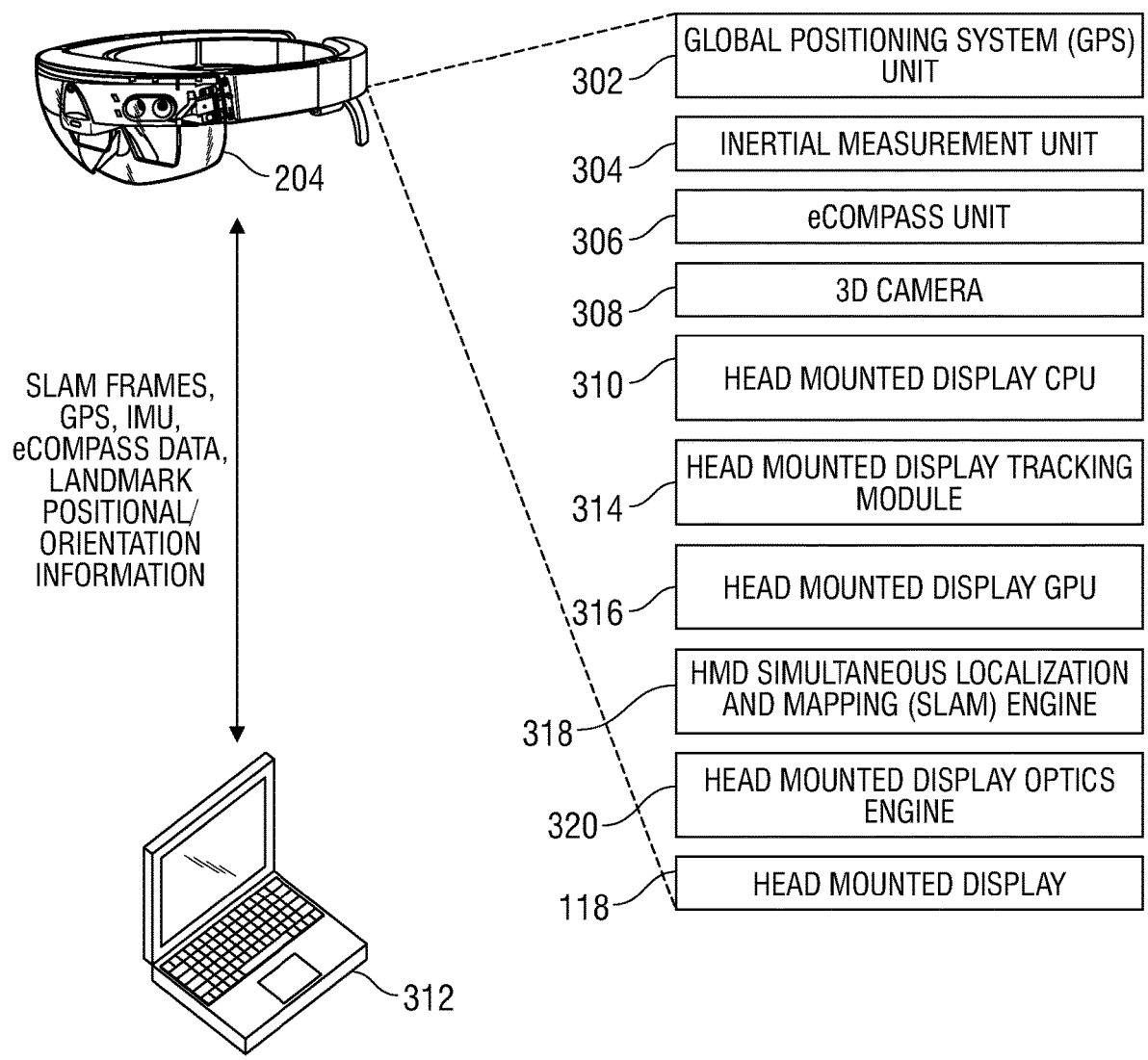
FIG. 3 is a block diagram illustrating components of a head mounted display headset to an embodiment of the present disclosure.

FIG. 3 is a block diagram illustrating components of a head mounted display headset incorporating a predictive SLAM system to an embodiment of the present disclosure.

In an embodiment, one or more subsystems within a head mounted display information handling system 204 may execute code instructions of the predictive SLAM system, or may operate in tandem with the predictive SLAM system.

The head mounted display information handling system 204 in an embodiment may include subsystems for measurement of its position and/or orientation. For example, the head mounted display information handling system 204 in an embodiment may include positional sensors such as a global positioning system (GPS) unit 302, an inertial measurement unit (IMU) 304, an e-Compass unit 306, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g. GPS unit 302, IMU 304, and/or eCompass unit 306) in an embodiment may operate to measure location coordinates (x, y, z) of the head mounted display information handling system 204, as well as orientation (θ), velocity, and/or acceleration. Velocity, acceleration, and trajectory of the head mounted display information handling system 204 in such an embodiment may be determined by comparing a plurality of measured location coordinates and orientations taken over a known period of time, or may be measured directly by onboard positional sensor such as an accelerometer.

The head mounted display information handling system 204 may also be capable of capturing video or still images of its surrounding environment, which may include one or more identifiable landmarks. For example, the head mounted display information handling system 204 may include a head mounted display two or three-dimensional camera 308. The head mounted display three-dimensional camera 308 in an embodiment may be, for example, a stereo triangulation camera, a sheet of light triangulation camera, a structured light camera, a time-of-flight camera, an interferometry camera, a coded aperture camera, or any other type of 3-D camera. The head mounted display three-dimensional camera 308 in an embodiment may capture a three-dimensional image of the surrounding environment including one or more landmarks from the perspective of the head mounted display 118. The three-dimensional image captured by the head mounted display three-dimensional camera 308 in an embodiment may be used to determine the position and orientation of the head mounted display with respect to the one or more landmarks. In some embodiments, the 3D camera 308 may be a two-dimensional camera with depth perception capabilities (e.g. RGB-D camera). In still other embodiments, the 3D camera 308 may include two or more two-dimensional cameras that may be used in tandem with one another and/or a laser distance measuring tool to determine a distance between the head mounted display and nearby landmarks.

The head mounted display information handling system 204 in an embodiment may further include a head mounted display CPU 310, which may execute instructions of the predictive SLAM system. The head mounted display CPU 302 may execute such instructions to transmit an image of the surrounding environment captured by the three-dimensional camera 308, the measured position (x, y, z), orientation (θ), velocity, and/or acceleration of the head mounted display information handling system 204 to the wirelessly connected laptop or desktop information handling system 312 via a network adapter in an embodiment. The CPU 310 may also execute instructions of the predictive SLAM system to receive SLAM frames indicating the positions of the head mounted display information handling system 204 and one or more identified landmarks in the surrounding environment from the remotely connected laptop or desktop information handling system 312 via the network adapter.

The head mounted display information handling system 204 in an embodiment may further include one or more subsystems capable of identifying one or more landmarks within three-dimensional image information. For example, the head mounted display information handling system 204 may include a head mounted display tracking module 314. The head mounted display tracking module 314 in an embodiment may access the three-dimensional image information of one or more nearby landmarks captured by the head mounted display three-dimensional camera 308. In some embodiments, the tracking module 306 may identify the physical boundaries of one or more potential landmarks within the three-dimensional image captured by the head mounted display three-dimensional camera 308. Once the physical boundaries of the landmarks are identified by the tracking module 314 in an embodiment, the distance between these identified items and the head mounted display 204 may be determined.

One or more subsystems capable of determining a position/orientation of such identified landmarks with respect to the head mounted display information handling system 204 may also be included onboard the head mounted display information handling system 204 in an embodiment. For example, the head mounted display information handling system 204 may include a graphics processing unit (GPU) 316 which may determine the position/orientation of such identified landmarks with respect to the head mounted display information handling system 204 through analysis of the positional information measured in the image captured by the three-dimensional camera 308 in combination with the identification by the head mounted display tracking module 314 of the one or more landmarks. In some embodiments, a similar process may be executed by the head mounted display CPU 310 in order to identify the location/orientation of the one or more landmarks with respect to the head mounted display information handling system 204. In still other embodiments, such positional/orientation information may received at the CPU 310 or GPU 316 from the remotely located laptop or desktop information handling system 312 via a network adapter.

The head mounted display information handling system 204 may further include one or more subsystems capable of mapping the positions/orientations of the head mounted display information handling system 204 and one or more identified landmarks within a virtual three-dimensional environment in an embodiment. For example, the head mounted display information handling system 204 may include a head mounted display (HMD) simultaneous localization and mapping (SLAM) engine 318. The HMD SLAM engine 318 in an embodiment may access the position/orientation information for the one or more landmarks with respect to the head mounted display information handling system 204 generated or received by the CPU 310 or GPU 316, and use this information to generate a three-dimensional virtual map of the head mounted display information handling system 204 and its surrounding environment, including the one or more identified landmarks. In other embodiments, the CPU 310 or GPU 316 may receive one or more SLAM frames including three-dimensional virtual maps of the head mounted display information handling system 204 and its surrounding environment from the remotely located laptop or desktop information handling system 312 via a network adapter.

In an embodiment, one or more subsystems capable of rendering an image of the surrounding environment from the perspective of the head mounted display information handling system 204 may also be included onboard the head mounted display information handling system 204. For example, the head mounted display information handling system 204 may include a head mounted display optics engine 320, which may access the three-dimensional virtual map generated by the HMD SLAM engine 318 or received from the remotely located information handling system 312 in an embodiment. The head mounted display optics engine 320 in an embodiment may render a three-dimensional image of the surrounding environment including the identified one or more landmarks based on the location/orientation of the landmarks with respect to the head mounted display information handling system 204 within the virtual map, as with a virtual reality environment. In other embodiments, the head mounted display optics engine 320 may render a three-dimensional image of an object projected to appear as if it is incorporated within the environment surrounding the head mounted display information handling system 204, as with an augmented reality environment.

The head mounted display information handling system 204 in an embodiment may further include one or more subsystems capable of and displaying the rendered image of the surrounding environment within the head mounted display information handling system. For example, the head mounted display information handling system 204 may include a head mounted display 118, capable of displaying the image (e.g. virtual reality image, or augmented reality image) rendered by the head mounted display optics engine 320.

Figure 4:
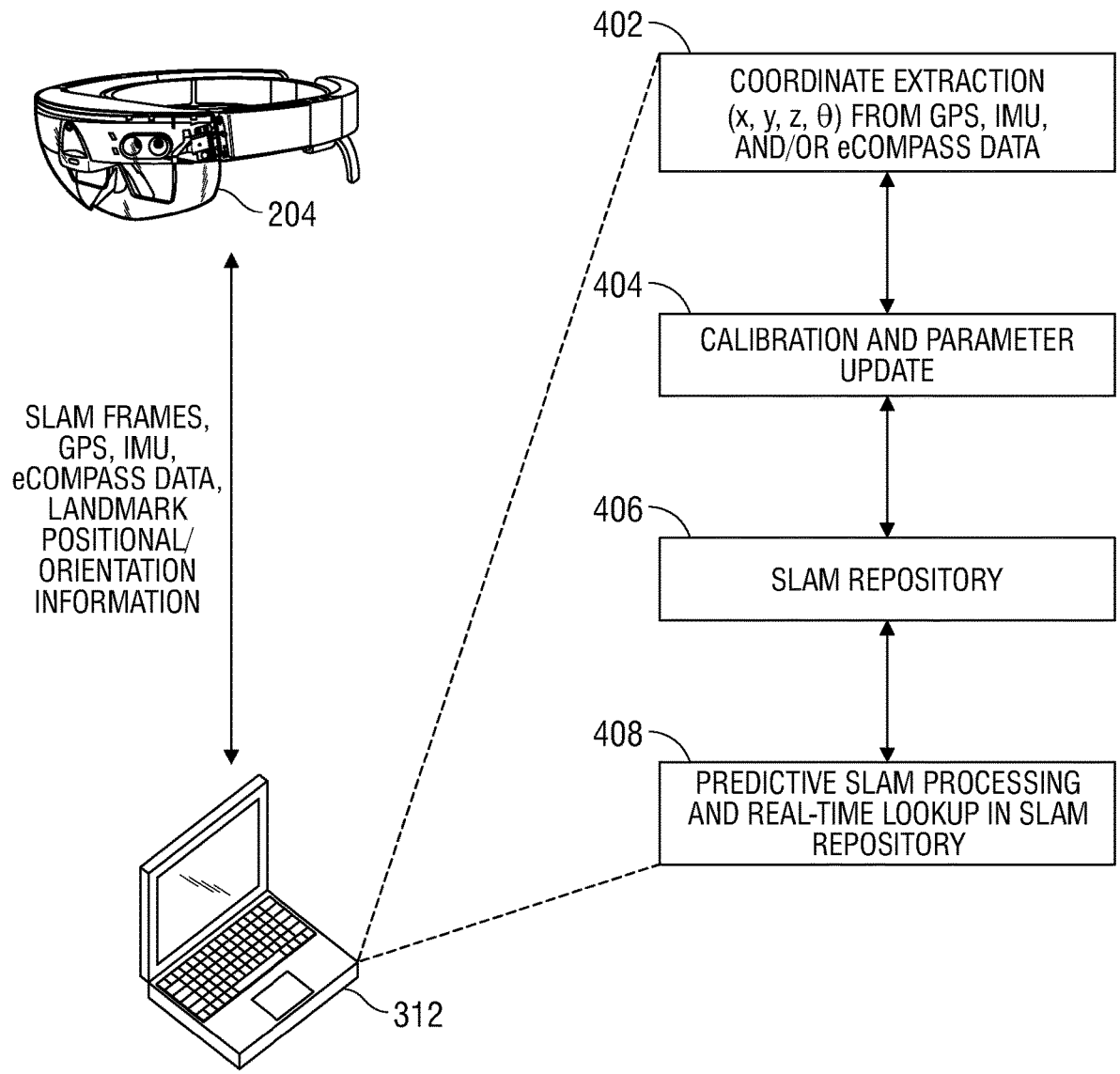
FIG. 4 is a graphical diagram illustrating components of an information handling system wirelessly connected to a head mounted display headset according to an embodiment of the present disclosure.

FIG. 4 is a graphical diagram illustrating components of an information handling system incorporating a SLAM lookup repository and predictive SLAM cache wirelessly connected to a head mounted display headset according to an embodiment of the present disclosure. The information handling system 312 in an embodiment may be located remotely from and in wireless communication with the head mounted display information handling system 204. For example, the information handling system 312 may receive an image of the surrounding environment captured by a three-dimensional camera of the head mounted display information handling system 204. The information handling system 312 may also receive positional sensor information such as from a GPS unit, an IMU, an eCompass unit, or any other type of positional sensor in the art.

A coordinate extraction subsystem 402 of the information handling system 312 in an embodiment may operate to extract global coordinates for the head mounted display information handling system 204 and/or other identified landmarks based on the position sensor information received, as well as previously captured images of the landmarks. Such positional sensor information may identify a position, orientation, velocity, and/or acceleration of the head mounted display information handling system 204 in a coordinate system fixed to the head mounted display information handling system 204. The coordinate extraction subsystem 402 in an embodiment may translate those HMD-centric coordinates into a global coordinate system that includes the location of the head mounted display information handling system 204 and the one or more identified landmarks. The measured position (x, y, z), orientation (θ), velocity, and/or acceleration of the head mounted display information handling system 204 (either the raw/unextracted data received from 204 or the extracted coordinates generated by subsystem 402) may be stored at the calibration and parameter update subsystem 404 in an embodiment.

Once distances and bearings between the head mounted display and one or more known landmarks are determined and transmitted to the information handling system 312 in an embodiment, the positions of the one or more landmarks and the headset may be identified within a first SLAM frame. In previous systems, a landmark may have been identified with a fairly high level of uncertainty in a first captured image, and then compared against a second image captured at a later time, after the headset has changed position with respect to the landmark to decrease the overall uncertainty associated with the identification of that landmark. In other words, the uncertainty associated with the identification of a given landmark or landmark(s) in such previous solutions may decrease while the system "learns" about its surrounding environment by moving around in it from frame to frame. In previous systems, the surrounding environment must be "learned" in each separate user session. In other words, the landmarks in each environment would have been identified from scratch during each separate user session. A real-time localization process that more efficiently and accurately identifies landmarks, without additional hardware is needed.

The predictive simultaneous localization and mapping (SLAM) system in embodiments of the present disclosure addresses these issues by comparing three-dimensional images associated with each SLAM frame with the coordinates of known or pre-identified landmarks in order to more efficiently identify the position of the headset with respect to such landmarks without resorting to brute force relocalization methods. For example, the information handling system 312 in an embodiment may include a SLAM lookup repository 404 which may include stored data that may aid in identification of one or more landmarks and their locations with respect to the head mounted display in a captured image received from the head mounted display device 204. The SLAM lookup repository 404 may include stored static or video images captured at an earlier time or date from a camera having the same position (x, y, z) and/or orientation (θ) as the position/orientation of the head mounted display information handling system 204 received via a network adapter. Stored static or video images may be taken from the same GPS coordinates as the head mounted display information handling system 204 in some embodiments. Such stored static or video images may be transmitted back to the head mounted display information handling system 204 to assist with landmark identification and determination of the head mounted display position in some embodiments. As described above, the uncertainty associated with the identification of a given landmark or landmark(s) and their locations with respect to the head mounted display in such previous solutions may decrease as more mapping information about those landmarks is gathered. Thus, the mapping information that can be gleaned from the static video or images stored in the SLAM lookup repository 404, including crowd-sourced images or images retrieved from cloud storage may increase the accuracy of landmark identification without having to capture multiple images at the head mounted display information handling system 204 in an embodiment.

Such static or video images stored at the SLAM lookup repository 404 in an embodiment may also include information identifying one or more landmarks within said static or video images, which may negate the need to identify landmarks using the head mounted display tracking subsystem. In some embodiments, such landmark identification information stored at the SLAM lookup repository 404 may compliment other landmark identification information generated by the head mounted display tracking subsystem. For example, the head mounted display tracking subsystem may be capable of identifying a first subset of landmarks based on images captured at a given set of coordinates, while information received at the head mounted display information handling system 204 from the SLAM lookup repository 404 associated with the same given set of coordinates further identifies a second subset of landmarks. In still other embodiments, the landmark identification information stored at the SLAM lookup repository 404 may be combined with the landmark identification information generated at the head mounted display information handling system 204 to increase the accuracy of a landmark identified in both the SLAM lookup repository 404 data and the data generated by the head mounted display tracking subsystem.

In still other embodiments, the SLAM lookup repository 404 may include fully mapped SLAM frames generated based on images captured from the same position (x, y, z) and/or orientation (θ) as those of the head mounted display information handling system 204. In such embodiments, the fully mapped SLAM frame(s) may be transmitted back to the head mounted display information handling system 204. Receiving such a fully mapped SLAM frame at the head mounted display information handling system 204 may negate both a need for the head mounted display tracking system to identify landmarks and for the HMD SLAM engine to generate a SLAM frame in an embodiment. In other embodiments, the SLAM frame transmitted from the information handling system 312 may be used at the head mounted display information handling system 204 to increase the accuracy of the measured position of the head mounted display. For example, if the position of the head mounted display is determined through the use of an extended Kalman filter in an embodiment, measured locations drawn from the SLAM repository 406 used in combination with the same or similar measured locations drawn from measurements of the current user session may be associated with a higher Kalman gain.

The information handling system 312 in an embodiment may further include a predictive SLAM cache 408, which may store fully mapped SLAM frames associated with a given set of coordinates. The received positional/orientation information stored at the calibration and parameter update subsystem 404 in an embodiment may include velocity/acceleration information for the head mounted display information handling system 204 in an embodiment. The combination of this data stored at the calibration and parameter update subsystem 404 may be used in some embodiments to estimate a projected trajectory of the head mounted display information handling system 204 through a series of future coordinates. If any of these predicted future coordinates match coordinates associated with a SLAM frame stored in the predictive SLAM cache 208 in an embodiment, the information handling system 312 may transmit that SLAM frame, along with the time in the future at which the head mounted display information handling system 204 is expected to reach that future predicted coordinate. Receiving such a fully mapped SLAM frame at the head mounted display information handling system 204 may negate both a need for the head mounted display tracking system to identify landmarks and for the HMD SLAM engine to generate a SLAM frame for the future time at which the head mounted display information handling system 204 is expected to reach those coordinates in an embodiment. In other embodiments, the predictive SLAM frame transmitted from the information handling system 312 may be used at the head mounted display information handling system 204 to assist in relocalization of the head mounted display (e.g. reassessing the true position of the head mounted display) without resorting to brute force relocalization methods that require the head mounted display to be physically tethered to an external information handling system.

Figure 5:
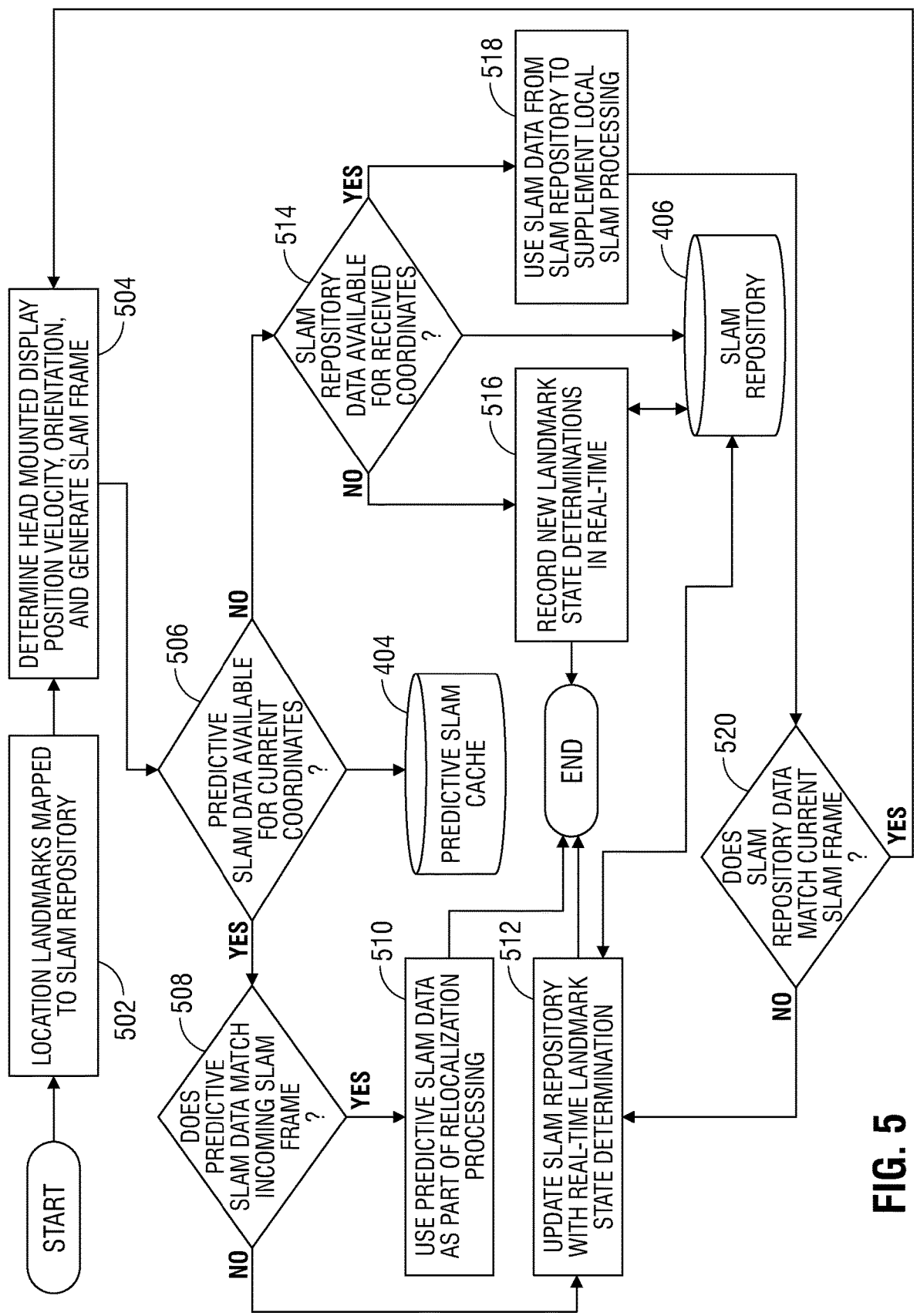
FIG. 5 is a flow diagram illustrating a real-time SLAM process according to an embodiment of the present disclosure.

FIG. 5 is a flow diagram illustrating a real-time SLAM process of determining localization information for one or more identified landmarks with reference to a head mounted display headset according to an embodiment of the present disclosure. In an embodiment, localization information may identify a position of a head mounted display information handling system with respect to one or more landmarks in the display's surrounding environment. Such information may be used to generate a three-dimensional map of the headset and the identified landmarks in a virtual environment. Determination of a position of a head mounted display with respect to one or more such landmarks in an embodiment may be a function of previous and current states (e.g. position, velocity, and acceleration) of a head mounted display as measured by on-board positional sensors (e.g. GPS, IMU, e-Compass, accelerometer), a current location of the head mounted display as determined based on analysis of captured images showing one or more nearby landmarks, and a Kalman gain (e.g. measure of the degree to which the determination of the location based on analysis of captured images may be trusted).

In order to generate such localization information, an image of one or more landmarks within the field of view of the headset may be captured, the landmarks may be identified within the image, the location of those identified landmarks with respect to the headset may be determined based on analysis of the captured image, and a SLAM frame combining the image with the identification of the landmark and the position/orientation of the landmark with respect to the head mounted display information handling system may be generated. Execution of each of these steps in real-time (as the head mounted display information handling system moves around in its surrounding environment and the field of view continuously changes) requires high speed processing capabilities. In previous systems these high processing requirements resulted in a need to tether the head mounted display information handling system to an external information handling system (e.g. laptop or desktop), thus limiting the mobility of the head mounted display. Embodiments of the present disclosure reduce the real-time processing capability required to complete this process by performing one or more of these steps prior to a user session and seeding SLAM frames generated during the user session with previously generated SLAM frames when available. This approach decreases the real-time computing requirements, negating the need to physically tether the head mounted display information handling system to an external information handling system, and increasing the mobility of the head mounted display.

At block 502, prior to a head mounted display user session, one or more location landmarks may be mapped to a SLAM repository. A user session in an embodiment may be a session in which a user dons the head mounted display information handling system, and moves about a given area while viewing images projected inside the head mounted display. For example, a head mounted display information handling system in an embodiment may be used in a design and engineering project to visualize proposed designs for wheelchair accessible ingresses/egresses for various doors in an established commercial building. In such a scenario, the user session may involve the user donning the head mounted display information handling system and moving about the commercial building while simultaneous viewing projected VR or AR images of a proposed wheelchair ramp design within the commercial building in which such a design may be constructed. At block 502, prior to the user donning the headset within the commercial building, locations of one or more landmarks within the commercial building may be identified and mapped. For example, a layout of the locations of one or more walls, corners, hallways, stairs, furniture, doors or other fixed and stationary objects may be recorded in a map and stored to a SLAM repository.

In some embodiments, the locations of these landmarks may be recorded in the form of global coordinates (e.g. GPS coordinates). In other embodiments, the locations may be recorded in the form of Cartesian (x, y, z), polar (r, θ) or spherical (r, θ, φ) coordinates. In such embodiments, the origin for the coordinates (e.g. Cartesian, polar, or spherical) may identified and associated with the coordinate values as stored in the SLAM repository. In such a way, the coordinates of one or more landmarks viewed from the perspective of a user located at the coordinates' associated origin may be known. For example, in an embodiment described with reference to FIG. 2A, the location of the head mounted display 202 with respect to the first landmark 206 and the second landmark 208 may be determined at block 502. In such an embodiment, the coordinates of the head mounted display 202 with respect to the first landmark 206 may be recorded in polar coordinates (e.g. range 210 and bearing ($\theta_1$) 212). The coordinates of the head mounted display 202 with respect to the second landmark 206 may also be recorded in polar coordinates (e.g. range 214 and bearing ($\theta_2$) 216) in such an embodiment.

In still other embodiments, the locations of the landmarks may be determined through analysis of a static or video image of the landmarks as captured in an image (e.g. RGB-D, or three-dimensional image) stored in the SLAM repository and associated with the location from which the image was captured. In still other embodiments, locations may take the form of fully-mapped SLAM frames that combine an image of the landmarks with identification of the landmarks and known locations of the identified landmarks with respect to the device that captured the image. Localization information in an embodiment may include each of these examples of information stored at the SLAM repository.

In other embodiments, SLAM frames generated during previous user sessions in which the user moved about the same area may be stored in a predictive SLAM cache. Predictive SLAM information may be useful when users of the headset are likely to move to the same location in the surrounding environment and view the same region of the surrounding environment. For example, in an embodiment in which the head mounted display information handling system is used to assist in designing a wheelchair ramp for a doorway currently using stairs to access the floor of a commercial building, a designer may don the head mounted display during more than one session to view the area. During a session, the designer may be likely to enter through the door, descend the stairs, then stand at the proposed base of the ramp within the commercial building and turn to view the doorway at the proposed top of the ramp. In such a scenario, it may be said that the proposed base of the ramp and the doorway are regions of interest. Further, the designer is likely to return to this region of interest via the doorway and stairs during future sessions.

The predictive SLAM cache in such an embodiment may store the SLAM frame generated during the first user session identifying the doorway at the top of the proposed ramp as a landmark, viewed from the perspective of the location at the proposed bottom of the ramp. That SLAM frame may also be associated with the location of the doorway and/or the location of the bottom of the stairs leading to the commercial building floor. Such an association may reflect the likelihood that, during a user session, a user who accesses the building floor through this door and stairs will likely return to the proposed bottom of the ramp and turn to view the proposed top of the ramp.

At block 504, during a user session, the head mounted display information handling system position, velocity, acceleration, and/or orientation may be determined. For example, once the user dons the head mounted display information handling system and initiates a user session, he or she may then move about the surrounding environment (e.g. commercial building). In such an embodiment, as the user moves about, positional information for the head mounted display information handling system may be measured and/or recorded. For example, in an embodiment described with respect to FIG. 3, positional sensors such as a global positioning system (GPS) unit 302, an inertial measurement unit (IMU) 304, an e-Compass unit 306, and/or other positional measurement tools such as an accelerometer, a capacitive transducer, a hall effect sensor, a laser doppler vibrometer, a multi-axis displacement transducer, a potentiometer, or a confocal chromatic sensor may measure location coordinates (x, y, z) of the head mounted display information handling system 204, as well as orientation (θ), velocity, and/or acceleration. Velocity, acceleration, and trajectory of the head mounted display information handling system 204 in such an embodiment may be determined by comparing a plurality of measured location coordinates and orientations taken over a known period of time, or may be measured directly by onboard positional sensor such as an accelerometer.

In some embodiments, one or more likely future trajectories or future positions may be determined based on the position, velocity, orientation, and/or acceleration data gathered at an instance in time. For example, the wheelchair ramp designer using the headset as she enters the commercial building via the door and stairs described above may have a velocity, acceleration, and/or orientation once she reaches the bottom of the stairs that indicates she is moving toward the position at the proposed bottom of the ramp. As another example, in an embodiment described with reference to FIG. 2B, the head mounted display may have a measured position 218 with respect to the first landmark 206 and the second landmark 208. In such an embodiment, the predictive SLAM system may determine, based on the position, velocity, orientation, and/or acceleration data for the head mounted display measured at block 504 that the head mounted display is likely to move to the predicted position 222.

In previous systems, in order to accurately determine a projected trajectory for the headset, a brute force relocalization method was employed. In a brute force method, several different possible movements may have been predicted based on the current position, velocity, and/or acceleration of the headset. Using a brute force approach, each of these possible predicted movements may have been tested, one at a time, against measured positions to determine the most likely predicted movement. Such an approach consumes a large amount of computing resources, forming one of the reasons for physically tethering the headset to an external information handling system. The predictive SLAM system in an embodiment avoids this brute force method by comparing measured trajectories against a smaller subset of possible trajectories. This smaller subset may be limited in some embodiments to trajectories taken by users in previous user sessions, as described by the information stored within the predictive SLAM cache 404.

The head mounted display information handling system 204 may also capture video or still images of its surrounding environment, which may include one or more identifiable landmarks at block 504 in an embodiment. For example, the head mounted display information handling system 204 three-dimensional camera 308 may capture a three-dimensional image of the surrounding environment including one or more landmarks from the perspective of the head mounted display 118. In an embodiment described with reference to FIG. 2A, a camera mounted in the front 204 of the head mounted display 202 may capture an image including the first landmark 206 and the second landmark 208. If such an image includes depth information (e.g. RGB-D image, or 3-D image), the image may be used to determine the range 210 and bearing 212 to the first landmark 206 and the range 214 and bearing 216 to the second landmark 208.

A SLAM frame combining the image and the position and orientation of the head mounted display 202 with respect to the first landmark 206 and second landmark 208 may also be generated at block 504. This SLAM frame may be generated at the head mounted display information handling system in some embodiments. For example, in an embodiment described with respect to FIG. 3, the SLAM frame may be generated at block 504 by the SLAM engine 318. In other embodiments, the SLAM frame may be generated at a wirelessly connected laptop or desktop information handling system. For example, in an embodiment described with reference to FIG. 4, the SLAM frame may be generated at the information handling system 312 and transmitted to the head mounted display information handling system 204. In such an embodiment, the SLAM frame generated at block 504 maybe referred to as an incoming SLAM frame.

The predictive SLAM system in an embodiment may determine at block 506 whether any predictive SLAM data is available for the coordinates of the head mounted display determined at block 504. The predictive SLAM system may perform this step by referencing the predictive SLAM cache 404, in which one or more previously mapped SLAM frames may be stored. Each SLAM frame stored in the predictive SLAM cache 404 may combine a previously captured image, identification of one or more landmarks within the captured image, and the positions of those landmarks with respect to the camera that captured the image. The predictive SLAM cache 404 in an embodiment may have stored SLAM frames associated with the current coordinates of the head mounted display if a previous user passed through the current coordinates on a given trajectory toward an area of interest. For example, in an embodiment in which a wheelchair designer wearing the headset reaches the bottom of the stairs leading from the doorway to the building floor, the predictive SLAM system may determine the coordinates at the bottom of the stairs are associated with a SLAM frame stored in the predictive SLAM cache 404 generated during a previous user session (or earlier in the current session) in which the wearer of the headset moved from the current coordinates to the bottom of the proposed ramp and turned to view the doorway. In such an embodiment, the SLAM frame stored in the predictive SLAM cache 404 may map a view of the doorway from the perspective of the bottom of the proposed wheelchair ramp. Such a SLAM frame may be associated within the predictive SLAM cache 404 with the coordinates at the bottom of the stairway, rather than the coordinates of the bottom of the proposed ramp, because a user passing by the bottom of the stairway is likely to continue on to the bottom of the proposed ramp. The predictive SLAM system in such an embodiment may further estimate the time at which the head mounted display is likely to reach that location based on the current velocity of the head mounted display and the distance between the current location and that likely future location.

As another example, in an embodiment described with reference to FIG. 2B, the predictive SLAM cache 404 in an embodiment may have a stored SLAM frame associated with the measured HMD position 218 if a previous user passed through the measured position 218 on the trajectory 220 toward the predicted position 222 to view the second landmark 208. In such an embodiment, the SLAM frame associated with the measured position 218 in the predictive SLAM cache may map a view of the second landmark 208 from the perspective of the predicted position 222. If predictive SLAM data is available, the method may proceed to block 508. If predictive SLAM data is not available, the method may proceed to block 514.

The predictive SLAM system may determine at block 508 whether the predictive SLAM data matches an incoming SLAM frame generated at the time at which the head mounted display is predicted to reach the end of the projected trajectory. As described above, when predictive SLAM data is available and associated with a current location, the predictive SLAM system in such an embodiment may estimate the time at which the head mounted display is likely to reach a predicted future location based on the current velocity of the head mounted display and the distance between the current location and that likely future location. Once the estimated time elapses, the predictive SLAM system in an embodiment may determine whether that predicted trajectory was correct by comparing the then-current location to the predicted location. In order to do so, the predictive SLAM system may generate a new SLAM frame for the then-current location and compare it to the SLAM frame retrieved from the predictive SLAM cache 404 at block 506. If the SLAM frame retrieved from the predictive SLAM cache 404 at block 406 matches the SLAM frame generated at the time the head mounted display was predicted to reach the predicted future location, then the predicted trajectory/future location are correct.

A SLAM frame generated in real-time may match a SLAM frame retrieved from the predictive SLAM cache 404 or the SLAM repository 406 if the positions of one or more landmarks identified in the generated SLAM frame can be positively identified as the same landmark(s) identified in the retrieved SLAM frame. Such a determination may be made using a SLAM landmark re-observation or data association validation gate, which may be known in the art. Comparisons of landmarks across multiple SLAM frames using such a known method may be more likely to pass a validation gate as the number of times the identified landmarks have been previously observed increases. Thus, likelihood of positively identifying one or more landmarks in real-time based on comparison to previously observed landmarks may increase as the number of SLAM frames of the same landmarks stored in the SLAM repository 406 or predictive SLAM cache 404 increases. If the predicted trajectory was incorrect, the method may move to block 512. If the predicted trajectory was correct, the method may proceed to block 510.

In an embodiment in which the predicted trajectory was correct, the predictive SLAM system may use the predictive SLAM data as part of relocalization processing at block 510. A relocalization process in an embodiment may be employed if it is unclear from both a captured image and positional measurements of the head mounted display what the position of the head mounted display is to any known landmarks. This may occur, for instance, when no known landmarks are identified in an image captured at a given location. Should such a circumstance arise, the predictive SLAM system in an embodiment may refer to the predictive SLAM frame identified within the predictive SLAM cache 404 at block 506 in order to determine the location of the head mounted display with respect to one or more landmarks.

In some embodiments, the relocalization process may be performed routinely, even when landmarks are clear from captured images, in order to calibrate the user position when tracking is lost, or to correct for additive drifts occurring over time in the SLAM process In such embodiments, the relocalization process may include measuring the updated position, velocity, and/or acceleration of the head mounted display via onboard sensors, then updating that state information with determinations of the current head mounted display position as made based on analysis of the predicted or generated SLAM frame. For example, in an embodiment described with reference to FIG. 2B, the head mounted display positional sensors may indicate the head mounted display has an updated position 222 having a range 224 and bearing 226 from the second landmark 208. The SLAM frame retrieved from the predictive SLAM cache may also reflect this position. However, the SLAM frame generated in real-time based on on-board positional sensor readings may indicate the head mounted display is located at position 228 having a range 230 and bearing 232 from the second landmark 208.

Each of the positions of the head mounted display with respect to the second landmark 208 (e.g. range and bearing) drawn from the SLAM frames may be associated with a determined Kalman gain describing the degree to which the predictive SLAM system trusts that recorded location. As the number of measurements of a given landmark taken from the same position increases, the Kalman gain may also increase in an embodiment. Thus, if a plurality of SLAM frames stored in either the predictive SLAM cache 404 or the SLAM repository 406 describe the second landmark 208 having the same location as recorded from a given location of the head mounted display, the position of the head mounted display with respect to the second landmark 208 as measured in those SLAM frames may be associated with a higher Kalman gain. As the Kalman gain associated with a position determination increases, the degree to which such a determination may adjust the measured position (e.g. by onboard sensors) similarly increases. In other words, in an embodiment in which the positional sensors indicate the head mounted display is located at position 222, and multiple SLAM frames in the SLAM repository 404 reflect the same position, the predictive SLAM system may update the current position to be at or very near the position 222. In other words, the predictive SLAM system may place more weight on the position determined based on previous SLAM frames than based on the current SLAM frame because the previous SLAM frames are associated with a higher Kalman gain.

In another example embodiment, the head mounted display positional sensors may indicate the head mounted display has an updated position 228 having a range 232 and bearing 230 from the second landmark 208. The SLAM frame generated in real-time may also reflect this position. However, the SLAM frame retrieved from the predictive SLAM cache 404 associated with a relatively high Kalman gain may indicate the predicted position of the head mounted display was at position 222 having a range 226 and bearing 224 from the second landmark 208. In such an embodiment, the predictive SLAM system may determine the position of the head mounted display is somewhere between the positions 222 and 228. This may be the case, despite both the position as measured onboard the head mounted display and the position as determined based on the real-time SLAM frame being in agreement that the head mounted display is located at position 222, because the determination of the location based on the stored SLAM frames is so heavily trusted.

Once a Kalman gain for a current observed position of the head mounted display information handling system is determined, a corrected position of the headset may also be determined. For example, once the Kalman gain for the real-time SLAM frame is determined (e.g. based on a comparison between the real-time SLAM frame and the SLAM frame retrieved from the predictive SLAM cache 404), an extended Kalman filter may be used to determine a corrected positional state of the headset using the equation:

$$X_C = X_P + G(X_S - X_P) \tag{1}$$

where $X_C$ is the corrected positional state of the wearable headset, $X_P$ is a previously determined or measured positional state of the wearable headset, G is the Kalman gain, and $X_S$ is the currently observed positional state of the wearable headset determined based on the current SLAM frame. By adjusting the Kalman gain based on previously stored SLAM frames stored in the SLAM repository, the position of the head mounted display may be more accurately gauged using previously stored images/SLAM frames, without the use of a brute force algorithm. The method may then end.

The predictive SLAM system at block 612 in an embodiment may store the asset image, along with identification of any landmarks within it, and positional information describing the location of those identified landmarks from the perspective of the camera that captured the image in the predictive SLAM cache 404. The predictive SLAM system may further associate that stored asset image, identification, and position information with the predicted coordinates of the camera that captured the asset image, and the identification of the frame in which the asset image may match the SLAM frame captured by the head mounted display. Once the head mounted display captures said one hundredth SLAM frame, the predictive SLAM system in an embodiment may compare that captured one hundredth SLAM frame against the asset image and positional information stored in the predictive SLAM cache in order to more accurately gauge the position of the head mounted display with respect to the second landmark 208, as described above with reference to FIG. 5. In such a way, the predictive SLAM system in an embodiment may determine the position of the head mounted display with sufficient accuracy without comparing the measured trajectory of the head mounted display against a large number of possible trajectories, as is the case with brute force relocalization. By avoiding brute force relocalization, the predictive SLAM system reduces the processing requirements for the relocalization process, thus reducing the need to tether the head mounted display information handling system to another information handling system, making the head mounted display more mobile.

In an embodiment in which the predictive SLAM data does not match the incoming SLAM frame, the predictive SLAM system may update the SLAM repository with real-time landmark state determination taken from the incoming SLAM frame. As described above, the predictive SLAM frame may not match the incoming SLAM frame if the predicted trajectory does not match the actual trajectory of the head mounted display. In other words, the wearer of the head mounted display may have moved to a new set of coordinates, not previously visited in another user session. As such, the head mounted display may have a view of the surrounding environment not previously captured in a SLAM frame. At block 512, the SLAM frame generated for comparison with the predictive SLAM frame may be stored in the SLAM repository 406 for later use in determining the position of the head mounted display information handling system. The method may then end, as the current position of the head mounted display has been determined with respect to one or more nearby landmarks and mapped to a SLAM frame.

In an embodiment in which predictive SLAM data is not available for the predicted coordinates, the predictive SLAM system in an embodiment may determine whether any SLAM repository data is available for the current coordinates at block 514. The SLAM repository 406 in an embodiment may store previously recorded SLAM data, such as static or video images captured from a known set of coordinates with a known orientation. For example, in an embodiment described with respect to FIG. 2A, the SLAM repository 406 may store a previously captured static or video image of the first landmark 206 and the second landmark 208, captured from the position of the head mounted display 202, having a range 210 and bearing 212 with respect to the first landmark 206 and a range 214 and bearing 216 with respect to the second landmark 208.

In another embodiment, the SLAM repository 406 may store previously recorded static or video images captured from the known set of coordinates/orientation accompanied by positive identification of one or more landmarks. For example, the SLAM repository 406 may store the previously recorded static or video images of the first and second landmarks 206-208, along with an identification of those landmarks. In still another embodiment, this information may also be accompanied by measurements of the ranges 210 and 214 and bearings 212 and 216, to form a fully mapped out SLAM frame identifying landmarks and their distances from the camera that captured the image. If such SLAM data stored within the SLAM repository 406 is not available for the coordinates measured at block 504 in an embodiment, this may indicate the head mounted display is located in a portion of the surrounding environment that has not been pre-mapped, and the method may proceed to block 516. If such SLAM data stored within the SLAM repository 406 is associated with the current coordinates of the head mounted display information handling system measured at block 504 in an embodiment, it may be used to increase the accuracy of determinations of the position of the head mounted display as it moves through its surrounding environment, and the method may proceed to block 518.

In an embodiment in which the SLAM repository 406 does not contain information associated with the coordinates measured at block 504, new landmark state data may be recorded at block 516 from the image captured and/or SLAM frame generated at block 504. The lack of SLAM information within the SLAM repository 406 in an embodiment may indicate the head mounted display is located in a portion of the surrounding environment that has not been pre-mapped. As such, the image captured at block 504 may include a view of previously unrecorded portions of the surrounding environment. At block 516, new landmarks and/or their positions within that image may be identified and stored to the SLAM repository 406 for later use in the current or later user sessions, in order to increase the accuracy of determinations of the position of the head mounted display during those sessions.

At block 518, in an embodiment in which SLAM data stored within the SLAM repository is associated with the coordinates of the head mounted display measured at block 504, the predictive SLAM system may use SLAM data retrieved from the SLAM repository to supplement local SLAM processing. As described herein, increasing the number of positional measurements for a landmark may increase the accuracy of its determined position. In other words, if the same position for a landmark is determined by multiple systems, or over multiple user sessions, that determined position may be more trusted than a similar determination made only once. In some embodiments, this may be reflected by increasing the Kalman gain associated with the determined location of one or more landmarks or of the head mounted display information handling system determined through the use of an extended Kalman filter.

The predictive SLAM system in an embodiment may determine whether the SLAM data retrieved from the SLAM repository matches the current SLAM frame at block 520. If the SLAM repository data does match the current SLAM frame, however, this indicates the determination of the location of the head mounted display is accurate, and the method may proceed back to block 504 to determine the location of the head mounted display at a later point in time. The process described by the loop from block 504 to 520 may be repeated intermittently in order to test the accuracy of determinations of the position of the head mounted display as it moves about its surrounding area.

The SLAM frame retrieved from the SLAM repository 406 may not match the SLAM frame generated at block 504 if the position of one or more landmarks have changed, if a previously identified landmark has been removed, or if another previously unidentified landmark appears in the current SLAM frame. In still other embodiments, identification of one or more landmarks not be possible in one of the SLAM frames due to lighting conditions or environmental conditions obscuring the edges of the landmarks. In any of these scenarios, it may be important to record the new state information for the landmarks in order to provide recent, updated information for use in future sessions. Thus, if the SLAM repository data does not match the current SLAM frame, the method may proceed to block 512, where the updated positional information of the landmarks determined based on the SLAM frame generated at block 504 may be stored in the SLAM repository 406 for later use. The method may then end.

Figure 6:
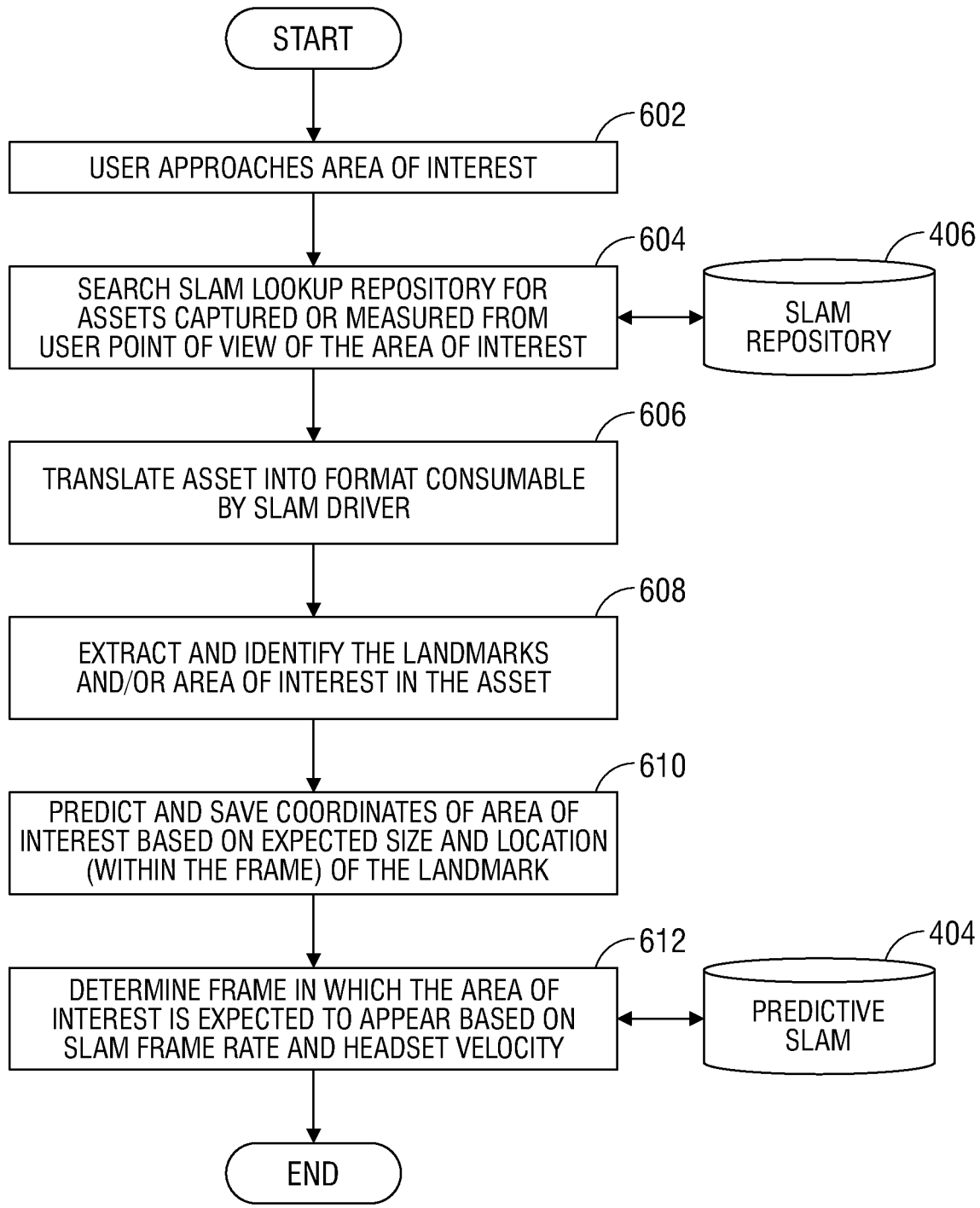
FIG. 6 is a flow diagram illustrating a predictive SLAM process according to an embodiment of the present disclosure.

FIG. 6 is a flow diagram illustrating a predictive SLAM process of generating a predicted SLAM frame of a region of interest according to an embodiment of the present disclosure. As described herein, a region of interest in an embodiment may be a location in the surrounding environment to which users of the headset are likely to move, or which users are likely to view from a given set of coordinates. For example, in an embodiment in which the head mounted display information handling system is used to assist in designing a wheelchair ramp for a doorway currently using stairs to access the floor of a commercial building, the proposed base of the ramp, and the doorway at the proposed top of the ramp may be regions of interest. At block 602, the predictive SLAM system in an embodiment may determine a wearer of the head mounted display information handling system is approaching the region of interest. Such a determination may be made based on the position/orientation measurements (x, y, z, θ) for the head mounted display information handling system. For example, in an embodiment described with reference to FIG. 2B, it may be determined that the wearer of the head mounted display is approaching a region of interest in which the second landmark 208 may be located. This may be determined by measuring the position of the head mounted display at location 218 in such an embodiment, with a velocity indicating it may be approaching the predicted position 222.

The predictive SLAM system in an embodiment may search the SLAM lookup repository for assets captured or measured from the user point of view of the area of interest at block 604. For example, in an embodiment described with reference to FIG. 2B, the predictive SLAM system may search the SLAM lookup repository 406 to determine whether any static or video images of the second landmark 208 captured from the perspective of position 222 have been stored. In some embodiments, such images may further include information describing the range 224 and bearing 226. In another example, the SLAM lookup repository 406 may have a stored fully-mapped SLAM frame combining an image of the second landmark 208 from the perspective of position 222, an identification of the second landmark 208 within the image, as well as information describing the range 224 and bearing 226.

The predictive SLAM system in an embodiment may translate the asset into a format consumable by a SLAM driver at block 606. In other words, the predictive SLAM system may analyze a captured image in order to determine the distance and orientation of various points within the image from the camera that captured the image. This may occur, for example, in an embodiment in which the asset retrieved from the SLAM repository 406 at block 604 is not a fully-mapped SLAM frame.

At block 608, the predictive SLAM system in an embodiment may extract and identify the landmarks and/or area of interest in the asset. For example, in an embodiment described with reference to FIG. 3, the head mounted display tracking module 314 in an embodiment may access a two or three-dimensional image of one or more nearby landmarks and identify the physical boundaries of the one or more potential landmarks within the image. Once the physical boundaries of the landmarks are identified by the tracking module 314 in an embodiment, the distance between these identified items and the head mounted display 204 may be determined by referring to the distance information determined in block 606 for the points in the image where the landmarks are identified. The image, the identification of the landmark, and the range/bearing of the landmark from the camera may then be combined into a single SLAM frame by the predictive SLAM system in an embodiment.

The predictive SLAM system in an embodiment may predict and save coordinates of the area of interest based on the expected size and location within the frame of the landmark at block 610. Once a landmark has been identified within the asset image, and the depth of the landmark has been determined, the range (r) between the camera capturing the image and the landmark may be identified. For example, in an embodiment described with reference to FIG. 2B, it may be determined from an asset image of the second landmark 208 captured from the perspective of a camera located at position 222 that position 222 is located a range 224 from the second landmark 208. Once the range is determined, the bearing of the landmark with respect to the camera that captured the asset image may also be determined by analyzing the placement along the x-axis of the landmark within the captured image. For example, the second landmark 208 may be located at an angle $\theta_{2P}$ from the center of the image frame. In such a scenario, it may be determined the second landmark 208 is located a distance equivalent to the range 224 from the position 222 at a bearing 226 equivalent to the angle $\theta_{2P}$ measured in a clockwise direction from the center of view of the head mounted display located at position 222.

The predictive SLAM system in an embodiment may determine the frame in which the area of interest is expected to appear based on the SLAM frame rate and the headset velocity at block 610. Once the position of the camera that captured the asset frame is determined, the distance between that determined position and the current position of the head mounted display may be determined. For example, in an embodiment described with reference to FIGS. 2A and 2B, if the range 214 and bearing 216 between the head mounted display at position 218 and the second landmark 208 is known, and the range 224 and bearing 226 between position 222 and the second landmark 208, the distance between the position 218 and the position 222 may be determined. Further, the velocity of the head mounted display may be measured while it is located at position 218, moving in the direction of the projected trajectory 220 toward the position 222. In such an embodiment, if the SLAM frame rate is ten frames per second (10 Hz), the current velocity of the headset is three feet per second (ft/s), and position 222 is located thirty feet from the current position 218 of the head mounted display, one hundred SLAM frames may be captured before the view of the second landmark 208 as captured within the asset may matches the view of the second landmark 208 as seen from the head mounted display information handling system.

The predictive SLAM system at block 612 in an embodiment may store the asset image, along with identification of any landmarks within it, and positional information describing the location of those identified landmarks from the perspective of the camera that captured the image in the predictive SLAM cache 404. The predictive SLAM system may further associate that stored asset image, identification, and position information with the predicted coordinates of the camera that captured the asset image, and the identification of the frame in which the asset image may match the SLAM frame captured by the head mounted display. Once the head mounted display captures said one hundredth SLAM frame, the predictive SLAM system in an embodiment may compare that captured one hundredth SLAM frame against the asset image and positional information stored in the predictive SLAM cache in order to more accurately gauge the position of the head mounted display with respect to the second landmark 208, as described above with reference to FIG. 5. In such a way, the predictive SLAM system in an embodiment may determine the position of the head mounted display with sufficient accuracy without comparing the measured trajectory of the head mounted display against a large number of possible trajectories, as is the case with brute force relocalization. By avoiding brute force relocalization, the predictive SLAM system reduces the processing requirements for the relocalization process, thus reducing the need to tether the head mounted display information handling system to another information handling system, making the head mounted display more mobile.

The blocks of the flow diagrams of FIGS. 5-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A head mounted display information handling system operating a predictive simultaneous localization and mapping (SLAM) system comprising:
    a camera mounted to a wearable headset capturing a first image of a first stationary landmark at a first location;
    a positional sensor mounted to the wearable headset measuring a current positional state of the wearable headset;
    a processor generating predicted position coordinates indicating an estimated location of the wearable headset with respect to the first stationary landmark at a future position;
    a network adapter receiving a previously stored SLAM frame from a previous location determined to match the predicted position coordinates of the wearable headset with respect to the first stationary landmark at a future position, the previously stored SLAM frame received from a remotely located SLAM frame repository, where the previously stored SLAM frame was generated prior to a current user donning the wearable headset, including a previously captured image at the previous location, an identification of the first stationary landmark within the previously captured image, and position coordinates of the first stationary landmark with respect to the previous location from which a previously captured image was captured to generate the previously stored SLAM frame;
    a processor executing code instructions of the predictive SLAM system to:
        generate a current SLAM frame of the first stationary landmark based on a second image captured via the camera mounted to the wearable headset;
        determine a Kalman gain associated with an observed location of the first stationary landmark based on the current SLAM frame and the previously stored SLAM frame; and
        determine corrected position coordinates of the wearable headset with respect to the first stationary landmark based on a previously measured positional state of the headset, a current positional state of the wearable headset, the current SLAM frame, and the Kalman gain.

2. The information handling system of claim 1, wherein the previous location coordinates from which the previously captured image of the stationary landmark was captured match estimated current predicted coordinates of the wearable headset range and bearing to the first stationary landmark predicted based on the previously measured positional state of the headset.

3. The information handling system of claim 1 further comprising:
    the processor identifying a second stationary landmark in the image captured via the camera mounted to the wearable headset; and
    the network adapter transmitting the image captured via the camera mounted to the wearable headset and an identification of the second stationary landmark within the image to the remotely located SLAM memory repository for future use with predicted coordinates of the wearable headset with respect to the second stationary landmark.

4. The information handling system of claim 3, wherein the current SLAM frame associates the captured image with the identification of the second stationary landmark, and a determined position of the second stationary landmark with respect to the wearable headset, further comprising:
    the network adapter transmitting the current SLAM frame to the remotely located SLAM memory repository.

5. The information handling system of claim 1, wherein the camera mounted to the wearable headset is a three-dimensional camera.

6. The information handling system of claim 1, wherein the positional sensor is a global positioning system (GPS) unit.

7. The information handling system of claim 1, wherein the corrected position of the wearable headset is determined based on an extended Kalman filter.

8. A method of determining a current positional state of a wearable headset comprising:
    receiving, via a network adapter, a current simultaneous localization and mapping (SLAM) frame including an image of a stationary landmark captured via a camera mounted to a remotely located wearable headset, an identification of the stationary landmark within the image, and a position of the stationary landmark with respect to the wearable headset;

predicting an estimated current positional state of the wearable headset based on a previous position state of the wearable headset;

identifying, via a processor, a previously stored SLAM frame generated prior to a current user donning the wearable headset associated within a SLAM memory repository with a previous positional state matching the estimated current positional state of the headset;

determining, via a processor, the previously stored SLAM frame includes an image, identification, and location of the stationary landmark;

determining, via a processor, a Kalman gain associated with the stationary landmark based on the current SLAM frame and the previously stored SLAM frame; and determining, via a processor, a corrected current position of the wearable headset based on a previously measured positional state of the headset, the current positional state of the headset, the current SLAM frame, and the Kalman gain.

9. The method of claim 8, wherein the estimated current positional state of the wearable headset includes predicted range and bearing position coordinates to a stationary landmark that is predicted based on the previous positional state of the wearable headset.

10. The method of claim 8 further comprising:
receiving, via the network adapter, the current positional state of the headset measured via a positional sensor mounted to the wearable headset to determine if the received estimated positional state is verified.

11. The method of claim 8 further comprising:
receiving, via the network adapter, the image captured via the camera mounted to the wearable headset and an identification of a second stationary landmark within the image from the wearable headset; and
storing the image and the identification of the second stationary landmark in a SLAM memory repository for future use with predicted estimated current positional state of the wearable headset with respect to the second stationary landmark.

12. The method of claim 11, wherein the current SLAM frame associates the captured image with the identification of the second stationary landmark, and a determined position of the second stationary landmark with respect to the wearable headset, further comprising:
storing current SLAM frame in the SLAM memory repository.

13. The method of claim 8, wherein the image captured by the camera mounted to the wearable headset combines a two-dimensional image with a distance between the camera and the first stationary landmark measured by a laser measuring tool mounted on the wearable headset.

14. The method of claim 8, wherein the positional sensor is an inertial measurement unit.

15. An information handling system operating a predictive simultaneous localization and mapping (SLAM) system comprising:
a network adapter receiving from a wearable headset a first positional state of the headset measured by a positional sensor mounted to the wearable headset;
a processor executing code instructions of the predictive SLAM system to:

predict a future position at a later instance in time of the wearable headset based on the first positional state of the headset;

the processor identifying an image of a stationary landmark stored in a SLAM memory repository and associated with the predicted future position based on a match to a previous position of wearable headset when the image of the stationary landmark stored in the SLAM memory repository was acquired;

the processor associating the image of the stationary landmark with an identification of the later instance in time;

the network adapter receiving, after the later instance in time, a second positional state of the headset measured at the later instance in time by the positional sensor, and a SLAM frame of the stationary landmark generated based on an image of the stationary landmark captured at the later instance in time by a camera mounted to the wearable headset;

the processor executing code instructions of the predictive SLAM system to:

determine a Kalman gain associated with the stationary landmark based on the image of the stationary landmark stored in the SLAM memory repository and the SLAM frame received via the network adapter; and determine a current state of the wearable headset based on the first positional state of the headset, the second positional state of the headset, the received SLAM frame, and the Kalman gain.

16. The information handling system of claim 15 further comprising:
the processor determining the predicted future position of the wearable headset is within a previously identified area of interest.

17. The information handling system of claim 15, wherein the image of the stationary landmark stored in the SLAM memory repository is associated with an identification of the stationary landmark within the image, and a determined position of the stationary landmark with respect to the wearable headset.

18. The information handling system of claim 15 further comprising:
the processor executing code instructions of the predictive SLAM system to:
identify the later instance in time by determining when the stationary landmark will become visible to the camera mounted to the wearable headset based on a SLAM frame rate of the wearable headset and the first positional state of the headset.

19. The information handling system of claim 15, wherein the first positional state of the headset identifies a range, bearing, and velocity of the camera mounted to the wearable headset with respect to the stationary landmark.

20. The information handling system of claim 15, wherein the positional sensor is an eCompass unit.

* * * * *